Oct. 6, 1931.  F. H. LANDRUM  1,825,700
METHOD AND APPARATUS FOR TESTING SEALED CONTAINERS
Filed Oct. 10, 1927  9 Sheets-Sheet 1

Inventor
Francis H. Landrum
By O'Neill & Bunn
Attorneys

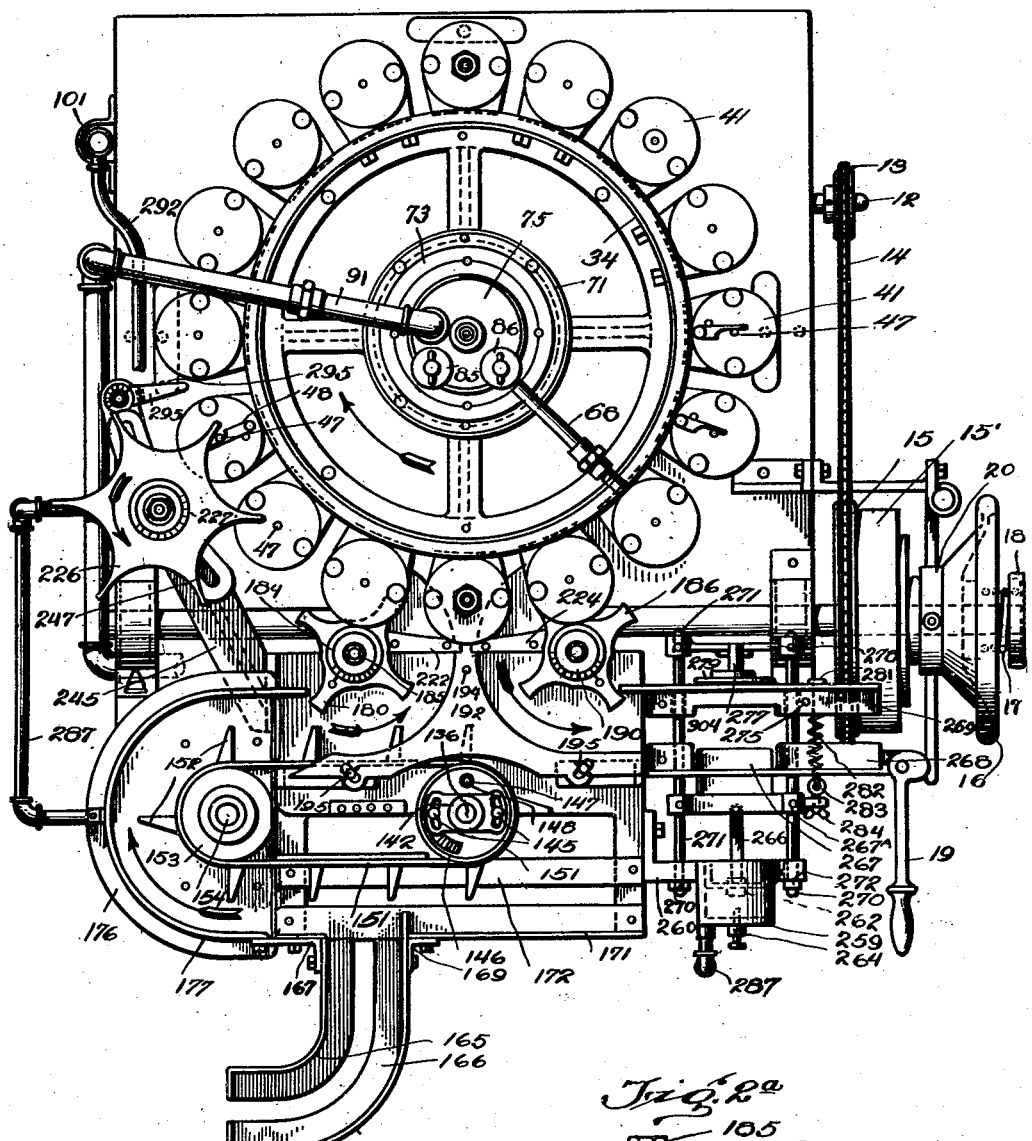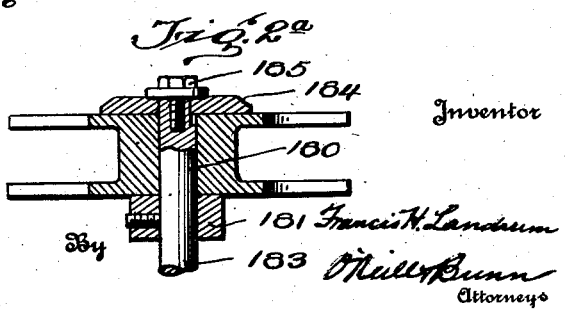

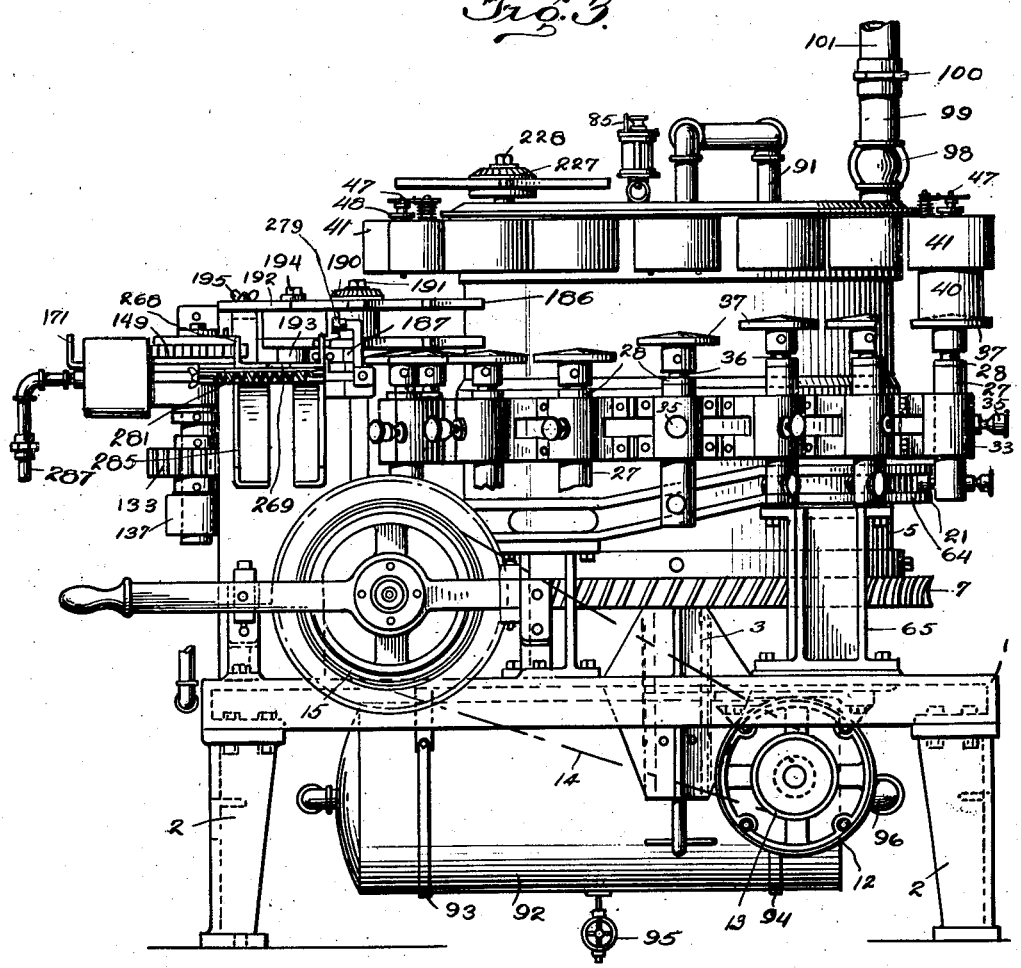

Oct. 6, 1931.  F. H. LANDRUM  1,825,700
METHOD AND APPARATUS FOR TESTING SEALED CONTAINERS
Filed Oct. 10, 1927  9 Sheets-Sheet 4

Inventor
Francis H. Landrum
By O'Neill & Bunn
Attorneys

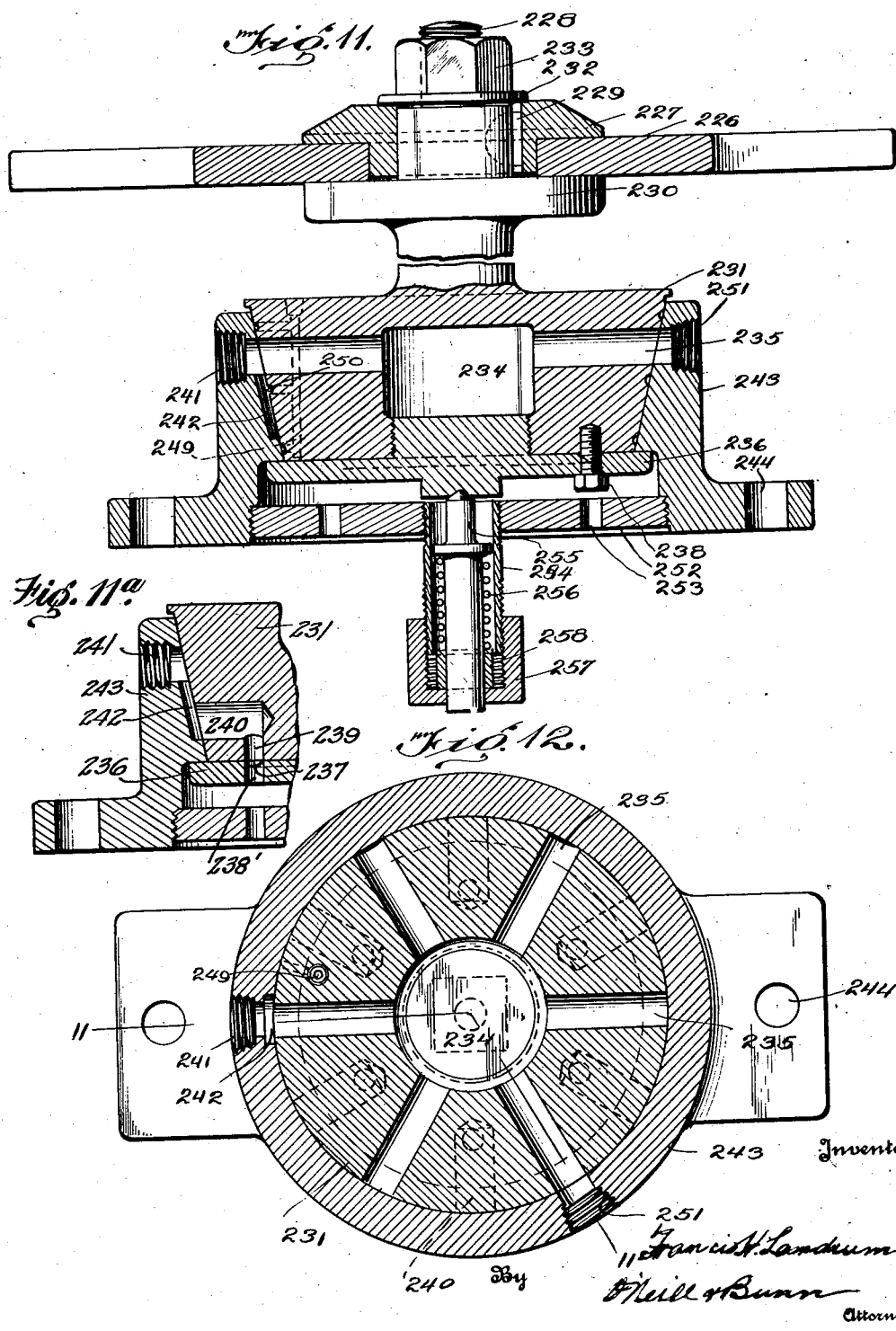

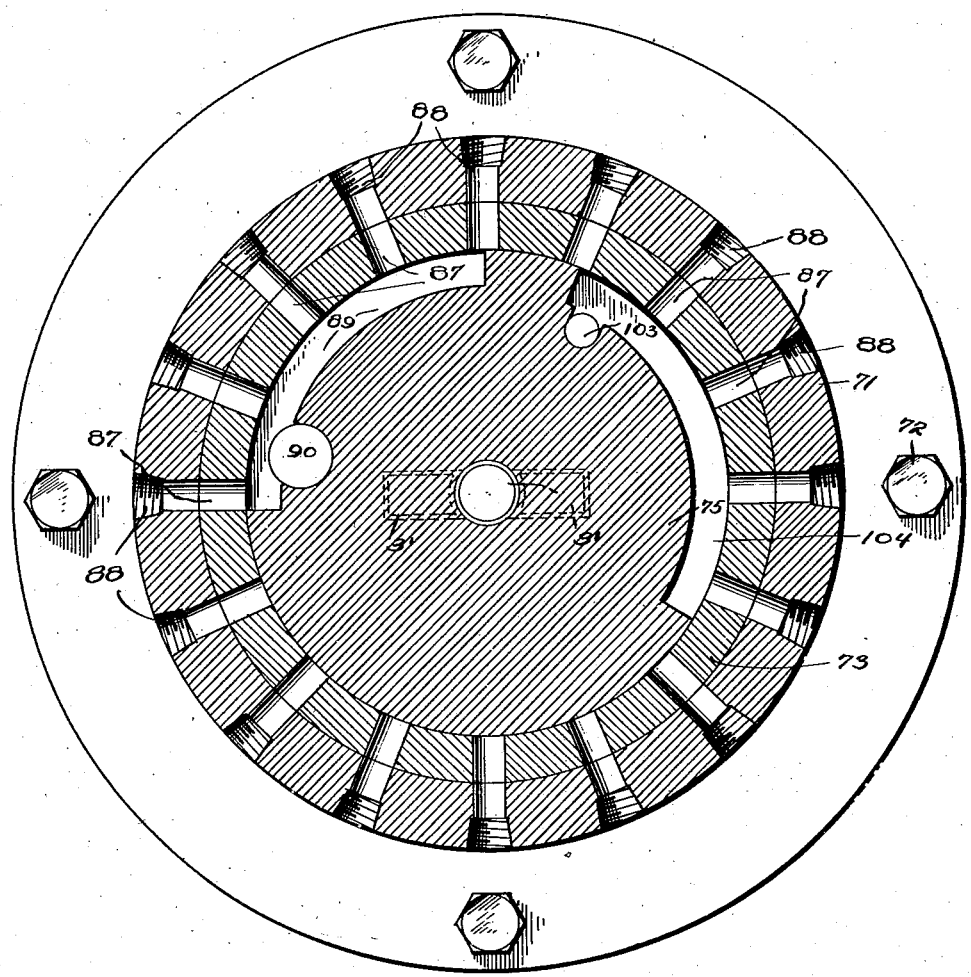

Patented Oct. 6, 1931

1,825,700

UNITED STATES PATENT OFFICE

FRANCIS H. LANDRUM, OF HONOLULU, TERRITORY OF HAWAII

METHOD AND APPARATUS FOR TESTING SEALED CONTAINERS

Application filed October 10, 1927. Serial No. 225,133.

The invention relates to means for and method of automatically testing sealed containers of foodstuffs and other commodities to determine the fluid pressure or the degree of vacuum in said containers in order that the containers in which the vacuum is deficient may be separated from those having the necessary or desired degree of vacuum or reduced internal pressure, the operation of the apparatus and the application of the method being predicated on the characteristic tendency of a flexible section of the container wall, usually the closure element, to move, bulge or convex outwardly, when the fluid pressure within the container exceeds the external pressure, as, for example, that of the atmosphere. The invention comprises a machine, including automatic means for applying a reduced fluid pressure to the exterior of a container or a portion of the container wall, which will move or bulge outwardly, when the predominant pressure is on the inside of the container, and so regulating the reduction of the external pressure that the defective containers will be evidenced by the outward movement of the wall section thereof, which movement is preferably communicated automatically to a suitable indicating and segregating mechanism, the object being to automatically separate the containers having high internal pressure or deficiency in the degree of vacuum from those of low internal pressure, or in which the desired degree of vacuum is maintained.

The invention is applicable to any and all types of containers for various commodities, in which a vacuum or low fluid pressure is produced and maintained, which vacuum or reduced pressure usually results in a portion of the container wall being deformed or forced inwardly under normal or atmospheric pressure, the portion of the container wall being "flipped", moved or convexed outwardly, when the pressure within the container exceeds that exterior thereof. The invention is also applicable in testing containers in which a portion of a wall or the closure therefor may be contoured inwardly or concaved by mechanical means, in the construction thereof, but which will be "flipped" or moved outwardly, when the pressure within the container exceeds that exterior thereof. The invention is likewise applicable to containers having flexible wall sections that are flat or in normal alignment with the container walls, when the desired degree of reduced fluid pressure or vacuum is maintained in said containers, which flexible sections move or bulge outwardly when a low fluid pressure is applied externally, or when the internal pressure exceeds the external pressure. Both the method and apparatus may be employed in testing containers in which a section of the wall, usually the closure, is normally convexed when the pressures inside and outside of the container are approximately equal, but which become concaved when the fluid pressure within the container is reduced. Obviously, therefore, the invention may be applied to the testing of various types of metal cans or tins containing foodstuffs or other commodities, also bottles, jars or other containers involving closures which are capable of being flexed under the action of differential pressures within and without the receptacle, and, in fact, the invention is adapted to testing filled containers of various types and forms and of various materials, so long as a wall or a portion of a wall of the container is susceptible of the flexing movement aforesaid.

A typical embodiment of an automatic machine for carrying out the novel method of testing and segregating containers of the character indicated, is illustrated in the accompanying drawings, in which:—

Fig. 2 is a plan view.

Fig. 2a is a sectional elevation of a star wheel.

Fig. 3 is a right side elevation.

Fig. 9 is a section on line 9—9 of Fig. 6.

Fig. 10 is a side view, partly in section, of a typical cam roller construction.

Fig. 11 is a section on line 11—11 of Fig. 12 of a valve which controls the automatic operation of the segregating means.

Fig. 11a is a fragmentary section showing the valve in exhausting position.

Fig. 12 is a horizontal section of the segregating valve.

Fig. 13 is a horizontal section of a central control valve to automatically time the application and exhaust of fluid pressure to the vacuum chambers.

Figure 1:
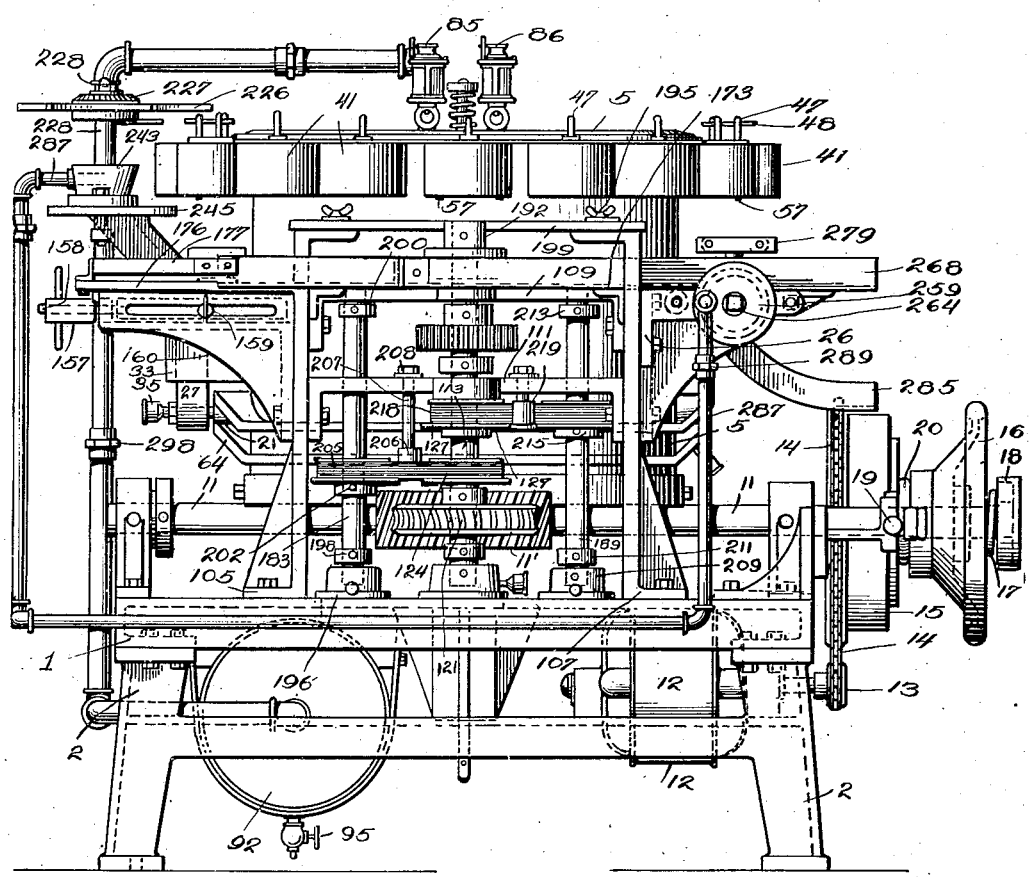
Fig. 1 is a front elevation of the machine.

In my prior application for Letters Patent of the United States No. 40,608, filed June 30, 1925, there is illustrated and described a means for and method of testing sealed containers, the mechanism being manually operated in carrying out the method and being limited in its ultimate results to the indication of the defective containers, but providing no means for segregating the same from perfect containers, and the present invention marks an extension of and improvement upon that of said prior application in that it provides for the automatic testing of containers fed continuously to a rotary machine which tests the containers separately in rapid succession and separates those that are defective from those that are normal or satisfactory.

Referring to Figs. 1 to 5 of the drawings, 1 indicates the base plate or table, provided with supporting legs 2, which constitute a support for the mechanism. The base plate 1 is provided near its center with a hub-like extension 1' projecting above and below the same and constituting a support for a central tubular shaft 3 secured therein in vertical position by set screws 4. The shaft 3 forms a support for a hollow drum 5 to the lower rim of which is fastened a worm gear 7, the hub of which is provided with an antifriction bearing 6 surrounding shaft 3 and supported by the upper edge of the extension 1'. Secured to the interior of the upper section of the drum is a spider 9, the hub of which carries an antifriction bearing 8 surrounding the shaft 3, the parts being so disposed and arranged that the drum is supported for free rotation about the shaft 3.

The worm gear 7 is driven by a worm 11' on shaft 11 journaled in bearing blocks secured to the top of the table 1, said shaft being connected to an electric motor, secured to the under side of the table, by chain and sprocket drive 13, 14 and 15, the sprocket 15 being an idler which may be engaged or disengaged from the shaft by clutch 15, which is preferably of the friction cone type and is moved into and out of operative relation by hand lever 19 cooperating with clutch yoke 20. In order to manually operate the shaft 11 for purposes of adjustment, a hand wheel 16 is splined to the outer end of the shaft. The clutch is provided with the usual spring tension member 17, which is adjusted by nut 18 on the end of shaft 11.

Figure 5:
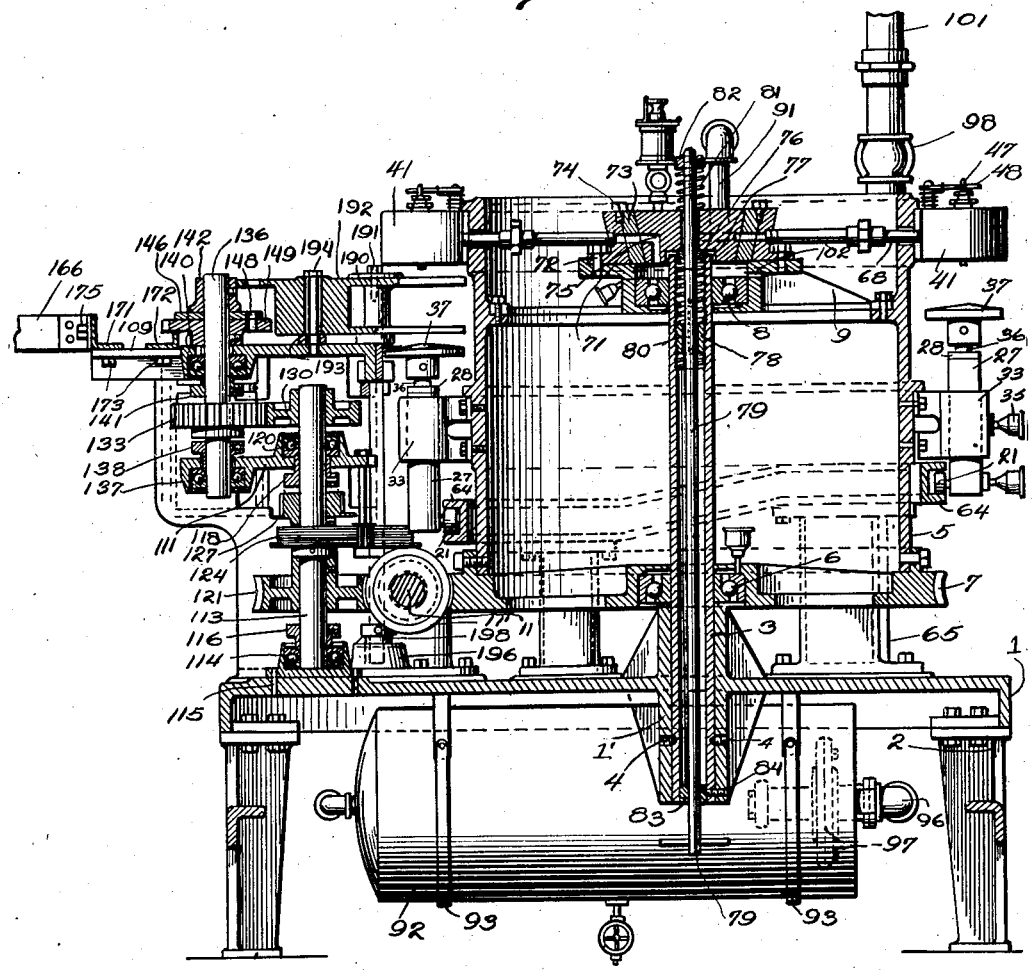
Fig. 5 is a sectional elevation.
Figure 6:
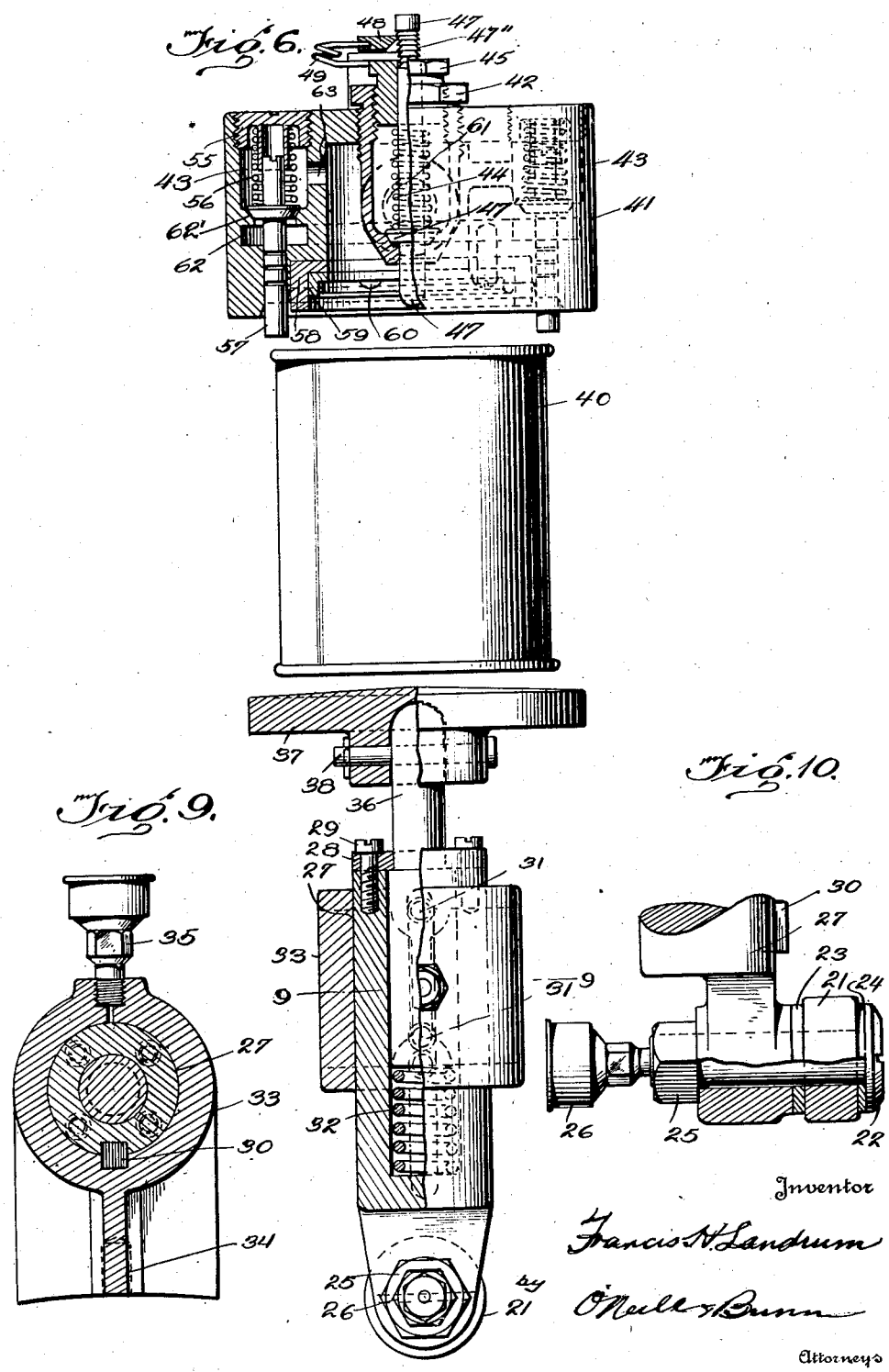
Fig. 6 is a side view, partly in section, of one of the vacuum chambers and the supporting device for engaging a receptacle therewith.

Secured to the outer surface of the drum in peripheral alignment is a series of supporting elements adapted to receive the containers to be tested, each of said supporting elements comprising a head or table element 37 which is pivotally connected by a cross pin 38 to the end of a section 36 of a yielding pitman or plunger, the rear end of the rod-like section 36 being enlarged and telescopically mounted within the bore of the coordinate pitman member 27, which latter is slidably mounted in a cylinder bearing 33 attached to the periphery of the drum 5 by bolts, the member 27 being prevented from rotating in the bearing 33 by a feather or spline 30, as indicated in Fig. 9. The enlarged section of rod 36 is held within the bore of the member 27 by means of a collar 28 secured to the upper edge of member 27 by bolts 29. A helical spring 32 mounted within the bore of the member 27 serves to force the rod section 36 outwardly until it is arrested by the collar 28, the spring being designed to yield under excessive pressure to prevent damage to the mechanism, and also to compensate for variations in the heights of the containers. Secured to the lower end of section 27 is a bearing pin 22, which is locked in position by a nut 25 and carries a roller 21 provided with wear washers 23 and 24. Preferably the bearing pin is fitted with a grease cup 26 to effect lubrication. The structural details of an individual supporting element are illustrated in Figs. 6, 9 and 10 and the particular relation of said element with respect to the drum 5 is clearly exemplified in Figs. 3, 4 and 5.

Secured to the upper portion of the drum in axial alignment with the supports for the containers is a series of vacuum chambers into engagement with which the various containers carried by the table-like elements 37 of the supports are moved during the testing operation, as will be more particularly explained hereinafter. These vacuum chambers and their accessories are all identical in construction and are illustrated in detail in Figs. 6, 7 and 8. Each of said vacuum chambers comprises a hollow casting 41 adapted to be secured to the peripheral face of the drum by bolts, one of said chambers being disposed in vertical alignment with each of the container supporting elements, as indicated in Figs. 3 and 6. The chamber 41 is provided with a bottom opening bounded by an inwardly tapering rim, within which opening is secured a sealing washer or gasket 58 of rubber or the like, which is held in position by ring 59, which is fastened in position about the peripheral edge of the opening in the casting by screws 60. The gasket 58 and the chamber 41 will, of course, be suitably shaped to conform to the contour of the container wall which is to be engaged with the vacuum chamber in the testing operation. In the particular embodiment of the invention, the machine is adapted to operate on containers having flexible closure elements, as illustrated at 40 in Fig. 6, in which case the gasket 58 is ring-shaped and is of the size and contour to engage as near the periphery of the closure of the container as possible, the function of the gasket being to seal the top of the container in air-tight relation with the vacuum chamber. Formed within the body of the vacuum chamber is a semi-circular duct 62, which communicates with an inlet port 61 in the rear wall of the vacuum chamber. Also formed within the body of the chamber 41 are two valve chambers 43, 43 communicating with the respective ends of the duct 62 through ports surrounded by valve seats 62', the upper portions of said valve chambers being connected to the open center of the vacuum chamber 41 by ports 63, 63. Co-operating with the valve seats 62' are pin valves 57, the lower ends of the stems of which extend below the lower face of the vacuum chamber 41, as indicated in Fig. 6. The upper end of the stem of each pin valve is guided in a socketed plug 55 threaded into the top of the vacuum chamber and each valve is held to its seat by helical spring 56, the tension of which may be regulated by adjusting the plug 55.

Figure 7:
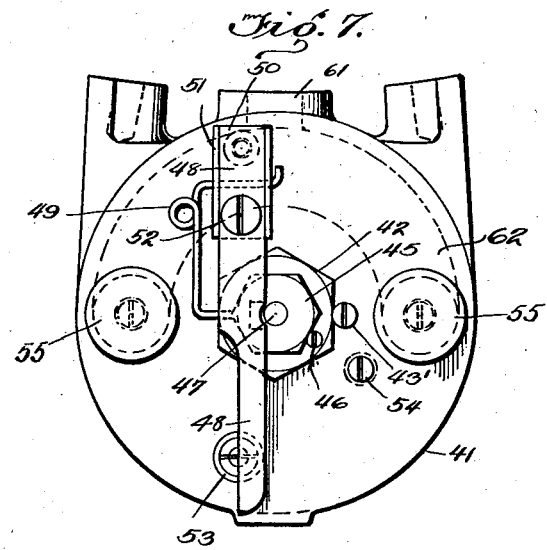
Fig. 7 is a plan view of a vacuum chamber showing the indicating and locking means.
Figure 8:
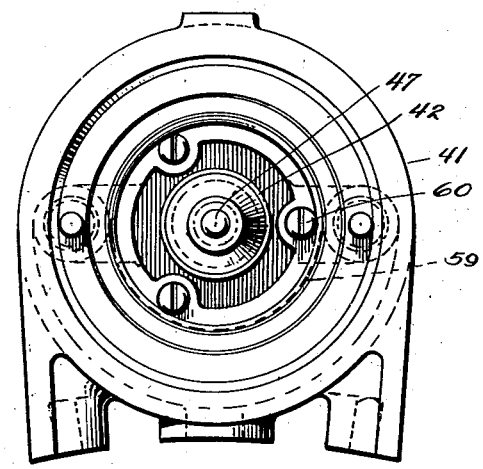
Fig. 8 is a bottom plan view of the vacuum chamber.

Threaded in a central opening in the upper face of the vacuum chamber 41 is a cage 42, in which is mounted, for reciprocatory movement, a pin 47, the lower end of which is guided in a suitable opening in the lower end of the cage, the upper end being guided in an adjusting nut 45 threaded into the opposite end of the cage and serving to regulate the pressure exerted by helical spring 44 surrounding the pin 47 and confined between an abutment 47' on the pin and the inner end of the nut 45, said abutment limiting the movement of the pin 47 toward the open face of the vacuum chamber. The relative position of the extreme lower end of pin 47, with reference to the opening in the lower face of the vacuum chamber, may be regulated by adjusting the cage 42 axially of the vacuum chamber, as will be understood. Both the cage 42 and the nut 45 may be locked in their adjusted positions by means of studs or bolts 43' and 46, respectively, as indicated in Fig. 7, thereby preventing accidental displacement of the cage or variation in the force exerted by the spring 44 on the pin 47. The pin 47 is provided at its upper end with a series of buttress threads 47'' with which cooperates a locking lever 48 pivoted at 52 to a spacer block 51, which, in turn, is secured to the upper face of the vacuum chamber 41 by a screw 50. A spring 49 anchored at one end to the spacer block 51 engages the lever 48 and holds the same normally in engagement with the threads on the pin 47, as indicated in Figs. 6 and 7. The forward end of the lever 48 is guided and supported by a screw stud 53 tapped into the top of the vacuum chamber, said forward end extending to a point adjacent the outer peripheral edge of the vacuum chamber. The distance of the lever 48 above the top of the vacuum chamber may be accurately regulated by means of shims or spacers placed under block 51 and washers under screw stud 53, so that said lever may be maintained in proper adjusted relation with respect to the buttress threads on the pin 47.

Surrounding the drum 5 and fastened to the top of the table 1 by legs 65 is a circular channel cam track 64, having a low section in front and a high section in the rear connected by intermediate inclines, the peripheral groove in the track being engaged by the rollers 21 on each of the receptacle supports, whereby said supports are moved toward and from the cooperating vacuum chambers 41, to engage the receptacles with and to disengage the same from said chambers, as the drum 5 rotates within the track.

Mounted on spider 9 is a compound distributing valve for connecting the inlets of the several vacuum chambers 41 with a source of reduced pressure and with the atmosphere, alternately, during the testing operations, said valve comprising a casing 71 attached to the spider 9 by screws 72, within which casing is a frusto-conical bushing 73 locked to the casing by screws 74. The casing 71 and bushing 73 are provided with registering radial ports 88 and 87, corresponding in number with the vacuum chambers 41, said ports 88 in the casing being connected to the inlet ports 61 of the cooperating vacuum chambers by pipes 68, as indicated in Figs. 2 and 5. Fitted within the bushing 73 is a valve 75, which, as shown, is of the full floating type of tapered plug valve, with its base resting on a collar 76, supported by helical spring 77 enclosed in the upper portion of hollow shaft 3, which spring is adjustably supported on screw plug 78 threaded into the shaft 3, said plug being rotated, to adjust the tension of the spring, by rod 79, which extends through shaft 3 and valve 75 and is connected to plug 78 by a feather key 80. Valve 75 is held from rotation within its casing by ears 3' on the end of the stationary shaft 3 engaging a rectangular recess in the bottom of the valve, see Fig. 13. The valve is held in operating contact with bushing 73 by a spring 81 and adjusting nut 82 on the upper end of rod 79. The lower end of rod 79 is journaled in a collar 83 fitting the lower end of the hollow shaft 3 and secured therein by one or more set screws 84. The valve 75 is provided with an arcuate port or duct 89, which spans several of the ports 87 in the bushing 73 and is connected by port 90 opening through the top of the valve with piping 91, which leads to a tank 92 suspended from the under side of the table 1 by straps 93. The tank 92 is connected by pipe 96 to a fluid pressure regulator 97, which controls the fluid pressure in said tank and, therefore, the fluid pressure applied to vacuum chambers 41 during the testing operations. From regulating valve 97, piping 101 leads to a suitable air pump (not shown) which is effective in maintaining the reduced air pressure in tank 92, as determined by the adjustment of the regulator 97. The valve 75 is also provided with a second peripheral arcuate duct or port 104, disposed as indicated in Fig. 13 to span several ports 87 in bushing 73 to establish communication with the atmosphere by a port 103 opening through the bottom of the valve and a port 102 in the hub of spider 9, as shown in Fig. 5, and thereby admit atmospheric pressure to vacuum chambers 41 at appropriate times.

Figure 4:
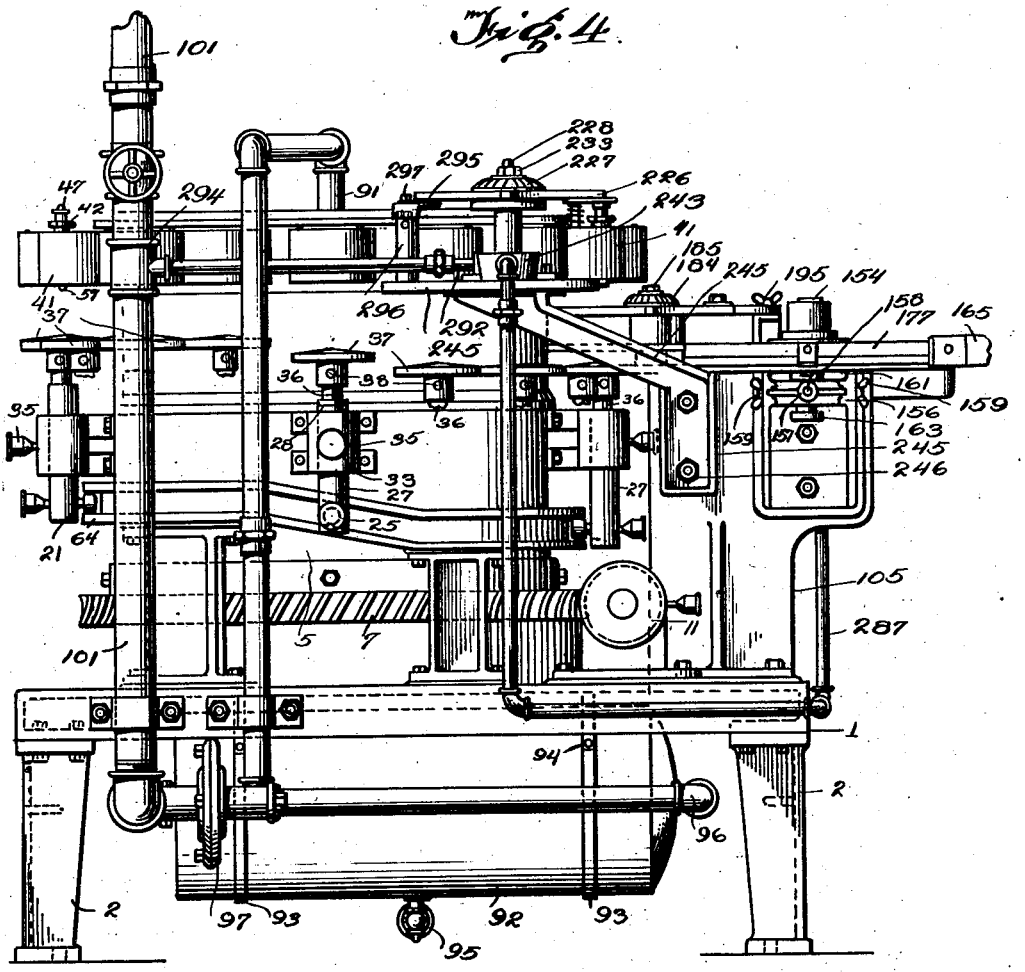
Fig. 4 is a left side elevation.

Mounted on the table 1, in advance of drum 5, is a frame-work comprising standards 105 and 107 supporting a top cross plate 109 and an intermediate cross plate 111 which constitute supports for the mechanism for delivering the containers to and removing the same from the drum carrying supports 37. Shaft 113, journaled in bearings 114 on table 1 and 120 on cross plate 111, is held against axial movement by collars 116 and 118 and is driven by worm gear 121 meshing with worm 11' on main shaft 11. Fast to shaft 113 are sprockets 124 and 127, which drive the feed and discharge star wheels, respectively. Near the top of shaft 113 is secured gear 130, which drives gear 133 fast to shaft 136, journaled in bearing 137 on cross plate 111 and bearing 140 on cross plate 109, said shaft being held against axial movement by collars 138 and 141. Detachably mounted on the upper end of shaft 136 is a sprocket 149 which drives the feed conveyer chain which delivers the receptacles to the first star wheel, said sprocket carrying a plate 146, which is locked thereto by a shear pin 148 fitted in hardened bushings mounted in aligning holes in the sprocket and plate, respectively, said pin constituting a safety device, which will be sheared off and stop the operation of the feed device in case of an overload being applied to the machine, or the jamming of a container in the machine. Secured to the end of shaft 136 is a winged collar 142, which is adjustably attached to plate 146, by screws passing through slots in the wings of said collar and engaging threaded holes in said plate. By loosening screws 145, sprocket 149 may be turned as a unit on shaft 136 to adjust the sprocket to a properly timed relation with the feeding star wheel, to be hereinafter described, after which adjustment has been made screws 145 are tightened and the sprocket again locked to shaft 136. The sprocket 149 drives a feed chain 151 provided with spaced lateral arms or dogs 152, which engage the containers successively, as the latter are moved into the path of said arms. The left end of feed chain 151 (Fig. 2) passes around idler sprocket 153 fast to shaft 154, which shaft is journaled in a take-up bearing block 156 slidably mounted in a bracket 160 secured to standard 105, said shaft being held in position in bearing 156 by collars 161 and 163. The bearing block is adjusted horizontally by a nut 157 engaging screw stud 158 attached to the block and passing through an opening in the front cross wall of bracket 160, and is locked in adjusted position by set screws 159 which pass through slots in the sides of the bracket 160, as indicated in Figs. 1 and 4.

Secured to standards 105 and 107 are flanged track sections 171 and 172 over which one reach of the feed chain 151 operates, the track receiving the receptacles from a lateral flanged track or trough, comprising spaced sections 165 and 166, to which the receptacles may be fed by hand, or by a suitable conveyer. A semicircular guide plate 176, secured to bracket 160, forms a continuation of the track over which the feed chain operates and is provided with a guard flange 177, which guides the receptacles advanced by the chain 151 around sprocket 153 onto cross plate 109 and into engagement with star wheel 180, which latter positions the containers on tables 37 of the drum carried supports.

The feeding star wheel 180 is mounted on the top of shaft 183, journaled in a bearing 196 on table 1 and in cross plate 109, said shaft being held against axial movement by collars 198 and 200. Said star wheel 180 rests on collar 181, which is locked to shaft 183 and the star wheel is held in driving relation with the shaft 183 by means of a disk 184, which surrounds the shaft, and is locked thereto by a stud extension engaging a groove in the top of the shaft, as indicated in detail in Fig. 2a. A set screw 185 tapped into the end of the shaft 183 forces the disk 184 into frictional engagement with the star wheel sufficient to cause the latter to rotate with the shaft 183, under normal conditions of operation, but to slip on said shaft should the mechanism become overloaded or jammed for any reason. The disk 184 is provided with peripheral graduations adapted to be brought into register with a zero mark on the star wheel in order to properly set or time the latter with respect to the receptacle supports carried by the drum 5.

In like manner, the discharge or outlet star wheel 186 is mounted on shaft 189 journaled in a bearing 209 on table 1 and in cross plate 109, said shaft being provided with collars 211 and 213, which prevent longitudinal movement of the shaft. Said star wheel 186 is mounted on and connected with shaft 189 by means identical with those employed in connection with star wheel 180 and is susceptible of the same character of adjustment on the shaft to effect proper timing of the star wheel with respect to the drum carried container supports.

A double semi-circular guide plate 192, positioned between the star wheels 180 and 186, acts as a side guide to the containers passing to and from the tables 37 of the container supports. This guide rests upon a spacer 193, see Figs. 3 and 5, and is swivelled upon a screw stud 194, the lower end of which is secured to cross plate 109. The lateral ends of said guide plate 192 are provided with slots 195 through which set screws pass to lock the plate in proper position with respect to the star wheels, the set screw and slot arrangement permitting any slight adjustment of the plate that may be necessary.

Star wheel shaft 183 is driven by chain 205 engaging sprocket 202 fast to said shaft, which chain is driven by sprocket 124 on shaft 113. A suitable chain tightener, comprising a roller 206 revolubly mounted on the stub shaft 207, which is adjustably clamped in a slot in cross plate 111 by a locking bolt 208, serves to maintain proper tension on said chain. Star wheel shaft 189 is driven by a sprocket 215 secured thereto, which is engaged by chain 218, which also engages driving sprocket 127 on shaft 113. A chain tightener 219 similar to that employed in connection with chain 205 is adjustably mounted on cross plate 111, as clearly indicated in Fig. 1. Attached to the rear edge of cross plate 109 are bridge plates 222 and 224, respectively, see Fig. 2, which serve as bottom guide plates for the containers, as they pass onto and off of the tables 37 of the drum carried supports.

The means for segregating or separating the containers having high internal fluid pressure or vacuum deficiency includes a movable section in the discharge chute, which section is withdrawn from the chute by pneumatic power means controlled by a valve, which is operated by the pins 47 which have been projected by the outward movement of the container sections in engagement with the vacuum chambers, as will be more particularly explained hereinafter. The segregating valve comprises a casing 243 into which fits the plug 231, the casing being mounted upon a bracket 245 secured to the lateral face of standard 105. The bracket is provided with a slotted portion 247 in which the valve assembly as a whole is adjustable in order to locate the valve in such position that it will be operated in proper timed relation with the arrival of a defective container on the movable section of the discharge chute.

The valve casing 243 is provided with lateral ears 244 by means of which the casing is attached to the slotted portion of the bracket 245. Said casing is provided with ports 241 and 251. The base of the casing is counterbored to receive a threaded plate 252 provided with one or more vent openings 253. At its center, plate 252 has a threaded opening to receive a tube 254, in which is mounted a conical pointed shouldered stem 255 surrounded by helical compression spring 256, which is adjusted by a nut 257 engaging the threads on tube 254, said nut carrying a bushing 258 upon which the helical spring rests. The pin or stem 255 constitutes a resilient support for the plug 231, the tension of spring 256 being adjusted to compensate for the atmospheric pressure on the valve plug to prevent the latter sticking. The conical valve plug is provided with radial ports 235, which communicate with a central chamber 234. The latter has a threaded opening in its bottom which is engaged by a flanged plug 236, the peripheral edge of which bears on the shoulder in the counterbored section of the valve casing, as illustrated in Fig. 11, and prevents the valve plug being forced out of the casing. The flanged plug is locked in position on the bottom of the valve by set screw 238. Between each of the radial ports 235, the plug is provided with a port or duct 240 which communicates with a vertical passage 239 which opens into an annular duct or passage 237, said duct being provided with a series of openings 238' in its bottom constituting exhaust ports for the valve, as shown in Figs. 11 and 11a. The valve casing is cut away adjacent and below port 241, as shown at 242, to afford a passage between port 241, extension 242, port 240, passage 239, groove 237 and openings 238' to the atmosphere. If desired the valve plug may be provided with lubricating ducts conventionally illustrated at 249 and 250.

The top of the valve plug has a central stem provided with a lateral flange 230 upon which rests a star wheel 226, which is adapted to be held in frictional engagement with the flange 230 by means of an annular plate or collar 227 which is fastened to the stem of the valve by a key 229, the upper end of the valve stem being screw threaded, as at 228, to receive a nut 233 and washer 232 by means of which the collar 227 is held in adjusted frictional relation with the star wheel, but to permit the latter to slip under overload or excessive strain. The collar 227 is provided with a graduated scale about its peripheral edge, which cooperates with an index mark on the star wheel to permit the proper adjustment of the latter.

The discharge chute for normal containers comprises parallel angle sections 268 and 269 attached to standard 107 with their upper surfaces in the plane of cross plate 109, so that the containers will be moved by the discharge star wheel 186 directly onto said chute. Below the chute formed by sections 268 and 269 is an inclined chute 285 through which the defective containers are discharged and communication between the upper chute and the lower chute is effected by means of a movable gate or slide 267, which normally forms a part of track section 268 of the upper chute, but which is retracted and breaks the continuity of said track section, when a defective container rests upon said gate member. The gate or slide 267 is mounted for horizontal adjustment on rods 270 and 271, which pass through lateral ears in the gate, which are secured to the rods by set screws 267a. The rods 270 and 271 are slidable in openings in a bracket-like casting 260, which is fastened by screws to the side of standard 107, and also in bearings in section 269 of the chute. The forward ends of the rods aforesaid are provided with lock nuts 272, which constitute adjustable stops for limiting the inward movement of the gate section 267. The rear ends of the rods extending beyond chute section 269 are joined by a cross yoke 278 secured to the rods by set screws, said yoke carrying a standard 277, to which is attached a vertically disposed pusher plate 279 adapted to be reciprocated part way across the discharge chute and to engage a container on said chute. If desired, the pusher plate, or the standard supporting the same, may be adjusted as to height. A stud 281 secured to chute section 269 affords an anchor for a helical spring 282, the front end of which engages a screw eye 283, the shank of which passes through an eye on the end of the yoke member of gate 267, and is adjusted to regulate the tension of the spring by a wing nut 284. This spring attachment serves to return the gate 267 to its normal position in alignment with the horizontal elements of chute section 268.

Formed integrally with the bracket member 260 is a cylinder 259 in which operates a piston 262 connected by rod 266 with the cross yoke of gate 267. The cylinder is provided with an adjustable central stop pin 264 which limits the inward movement of the piston and, therefore, the extent of the retractile movement of the gate 267. The cylinder 259 is connected by piping 287 to the outlet port 241 of the casing of the segregating valve, carrying star wheel 226, and the inlet port 251 of said valve is connected to the pipe line 101 leading to the exhaust pump, or to the tank 92, so that, when the star wheel 226 is moved by the indicator pin 47 of one of the vacuum chambers with which a defective container is engaged, communication between the source of reduced pressure and the cylinder 259 is established by the through passage 235 in the segregating valve plug and piston 262 is retracted within the cylinder by reason of the reduced pressure therein, or, conversely, by the predominant atmospheric pressure in the open end of the cylinder operating on the piston. This effects the withdrawal of the gate member 267 from registry with the chute section 268 and at the same time pulls the pusher element 279 across the chute, thereby forcing a defective container off of chute section 269 and causing the same to drop through the opening made by the withdrawal of gate section 267, and to fall upon the lower discharge chute 285.

As the star wheel continues its partial rotation, due to engagement by projecting pin 47, the ports 235 pass out of registry with the inlet and outlet ports in the valve casing and port 240 passes into registry with the extended member 242 of outlet port 241 of the distributor valve casing, thereby opening a free passage for atmospheric pressure to cylinder 259 as follows: The port 252 in the bottom of the distributor valve casing, port 238', annular groove 237, ports 239, 240, 242 and 241, pipe 287 to the cylinder. This balances the pressure on opposite sides of the piston 262 in said cylinder and permits spring 282 to move the piston, the gate section and the pusher element 279 back to normal position, so that said gate closes the gap between the sections of chute member 268 and the discharge chute is ready to receive and properly discharge normal containers.

Adjustably mounted on the end of bracket 245, beyond the star wheel 226, is a finger 295, which lies in the path of movement of the dog or locking lever 48 carried by each of the vacuum chambers, so that when said locking lever encounters the finger 295, the lever is moved out of locking engagement with the threads on pin 47, the latter is released and immediately returns to its normal position by spring 44, so that said pin is in proper position to take up its normal function in connection with another container which has in the meantime been positioned on table 37 below the corresponding vacuum chamber.

In the normal operation of the apparatus, the containers are fed to the chute, consisting of spaced members 165 and 166, and thence onto supporting bars 171 and 172 underlying one reach of the conveyer chain 151, so that the receptacles are engaged successively by the lateral arms 152 of the conveyer chain and finally guided into the space between two of the arms of star wheel 180, which moves the containers onto the tables 37 of the plunger-like supports carried by drum 5, said supports being in their lower positions inasmuch as the rollers 21 of each of said supports engage the lower section of the cam track 64, as indicated in Figs. 3, 4 and 5. After each of the plunger-like supports, carrying a receptacle positioned by the star wheel 180, passes the position opposite the segregating valve, the roller of the receptacle support engages the inclined section of the cam track and raises the stem and table member of the support until the top of the container is brought into engagement with the sealing ring of the cooperating vacuum chamber. The engagement of the top of the container with the vacuum chamber raises valves 57 from their seats and, shortly after this operation is effected, communication with tank 92 is established by way of central distributor valve, the casing of which revolves with the drum, so that the reduced pressure in said tank is applied to the vacuum chamber 41. This operation is repeated with each of the containers, as the drum is rotated, this reduced pressure being maintained until just before the rollers of the corresponding container supports reach the inclined cam section on the opposite side of the machine. At this time, port 104 of the central control valve comes into registry with the supply pipes 68 of several of the vacuum chambers 41 and atmospheric pressure is immediately admitted to said chambers by way of port 102 in spider 9 and opening 103 in the bottom of said supply valve, so that atmospheric pressure is applied to the tops of the containers and the latter are free to be separated from the sealing rings of the vacuum chambers, the separating movement being effected when the supports engage the inclined section of the cam track and gradually withdraw the containers from engagement with said vacuum chambers. The containers are then engaged by the discharge star wheel 186, which is properly timed or adjusted to effect such engagement and said receptacles are then moved by the star wheel onto the plate underlying the star wheel and are guided successively onto the discharge chute. All of the containers in which a normal vacuum or internal pressure is present, are moved over the chute in regular order by the following receptacles and may be delivered to a suitable conveyer or taken off by hand, as the case may be. The containers in which the vacuum is deficient, or which contain an internal pressure in excess of that to which the machine is adjusted, are dropped through the upper discharge chute onto the lower discharge chute by the withdrawal of gate section 267 in the upper discharge chute, as hereinafter explained, so that the defective containers are automatically separated from the normal containers. The particular apparatus herein exemplified is adapted to automatically test the vacuum or internal pressure in a series of containers, the end closures of which are adapted to be moved a certain amount under the application of differential pressures within and without the containers. The operation of the apparatus is as follows: It is to be assumed that the normal container being tested has an internal vacuum equal to eight inches of mercury, which is accepted as standard in various types of containers of foodstuffs or the like, which have been properly processed, and that about four inches of applied vacuum to the head or end closure of the container would be necessary to cause the closure to move or "flip" from its normal concave relation to a convex relation, if the pressure within the container was substantially equal to that of the atmosphere. In other words, if the container instead of having a vacuum therein equivalent to eight inches of mercury had a zero vacuum or atmospheric pressure, the closure "flips" or convexes upon the application of four inches or more of applied external vacuum, the pressure represented by the four inches of vacuum being that actually necessary to distort the metal of the closure. Therefore, the normal closure on a container having eight inches of vacuum therein would "flip" at four plus eight, or a total of twelve inches of external vacuum or reduced pressure applied to the vacuum chamber 41 with which the particular container is in engagement. It is desired to select automatically from a series of containers normally having eight inches or more of internal vacuum, all containers having zero vacuum or those known as "leakers", meaning those that have taken in a sufficient amount of atmospheric air to reduce the normal vacuum of eight inches to something less than eight inches and possibly to zero vacuum or atmospheric pressure. About two or three inches of vacuum, for commercial variations in the thickness in the metal and other manufacturing variables of the receptacle closures, is allowed, so that, in order to separate the containers having zero vacuum, or a relatively high internal fluid pressure, the degree of vacuum induced in chamber 41 should be that represented by four plus two, or about six inches of mercury. The amount of vacuum required to "flip" the flexible portion of a container depends upon several factors, such as the thickness and character or kind of material employed, whether the same has been heat treated, is provided with contour markings on its surface and also the effect of impact of the contour marking dies. Simple experimental tests are required to determine the amount of vacuum required to "flip" each type of container closure on a container having a high fluid pressure or zero vacuum therein. On the foregoing assumption, it will require eight plus four plus two, or fourteen inches external applied vacuum or reduced pressure to "flip" the closure on a container having an eight inch normal internal vacuum. If a vacuum of twelve inches is applied to the container, only those that are under eight inches internal vacuum will "flip". The closures on some types of containers may be of such construction that they will not produce the hereinbefore described "flip" or outward convexing, but will nevertheless move an appreciable amount, when subjected to a vacuum or reduced fluid pressure externally applied by way of the vacuum chambers 41, and the apparatus will operate effectively even when the movement of the closure under the differential applied pressure is very slight, inasmuch as the indicating pins 47 carried by the respective vacuum chambers may be so adjusted as to be engaged by and respond to the closure of any container which moves at all under the action of the reduced external pressure applied through the vacuum chamber. The operation of the machine, as hereinbefore set forth, applies to normal containers generally and in order to illustrate the automatic operation of the machine in segregating defective containers from normal containers, the course of a defective container, namely, one having a zero vacuum or reduced internal pressure therein will be traced. Such a container, after being delivered to the machine and positioned by feed star wheel 180 upon table 37 of one of the container supports, is carried by the support and rotary drum 5 in a circular path and the container support is moved upwardly by the cam track until the top of the container is engaged with the sealing ring on the lower face of the cooperating vacuum chamber 41. Immediately thereafter, the selected reduced external pressure is applied to the vacuum chamber 41 through the central distributing valve 75 and corresponding pipe 68 connecting the same with the vacuum chamber. Inasmuch as the valves 57 have been lifted from their seats by the engagement of the container with the sealing ring of the vacuum chamber, this reduced external pressure is applied to the closure of the container, which is sealed in air-tight engagement with the sealing ring of the vacuum chamber. This applied reduced external pressure to the closure of the container, by way of vacuum chamber 41, immediately causes the predominant pressure within the container to move the closure of the container outwardly or upwardly, thereby contacting the end of pin 47 and elevating said pin, which affords an indication that the container being tested is defective. The pin is immediately locked in its upward or projected position by locking lever 48, and is retained in said locked position until the drum 5 rotates to bring the vacuum chamber in which the pin 47 has been projected into engagement with the segregating star wheel 226. Meanwhile, the rotation of the drum brings the support, upon which the defective container is positioned, to a point where the central distributing valve opens up communication between the vacuum chamber with which said container is engaged and the atmosphere, and the support passing into engagement with the inclined section of the cam track 64 is lowered and withdraws the container from engagement with the vacuum chamber. When the defective container reaches star wheel 186, it is moved by the latter over the bridge plate 224 and the top of plate 109 onto the discharge chute comprising the two track sections 268 and 269, until it reaches gate 267 in the discharge chute, where it is moved by the following containers. The timing of the movement of the defective container from the supporting table 37 onto the gate 267 of the chute is so regulated that the projected and locked pin 47 of the vacuum chamber with which the defective container had been in contact, engages the star wheel 226 and imparts a partial rotation to the latter, the first portion of the rotatory movement turning the valve plug 231 of the segregating valve so that communication is established through said valve from tank 92 or, if desired, directly from the reduced pressure line 101, to cylinder 259, by way of pipe 287. As hereinbefore described, the reduced pressure within the cylinder 259 causes piston 262 to move inwardly in said cylinder and withdraws the gate 269 in the discharge chute and causes pusher head 279 to move the defective container, which had straddled the gate 267 and chute section 269, over the opening made by the retraction of gate 267, so that the defective container falls through said opening onto the lower chute 285, whence it may be delivered to a suitable conveyer, or otherwise disposed of. Immediately after the defective container has been discharged, the distributor valve operated by star wheel 226 is moved by the later portion of the rotatory movement of the star wheel by pin 47 to close communication between cylinder 259 and the source of reduced pressure and immediately opens said cylinder to the atmosphere, as hereinbefore explained, thereby permitting the spring 282 to restore the piston 262, the gate 267 and the pusher 279 to their normal relations, whereby the gate closes the gap in the upper chute or conveyer and the latter is again in condition to regularly discharge normal containers. During this entire operation, the pin 47 has remained in its projected relation and is restored to its normal position, when the locking lever 48 is engaged by trip finger 295 and moved out of engagement with the threads on the projected pin 47, allowing the spring on said pin to force the latter to its normal position, as indicated in Fig. 6, and said pin is in proper relation to cooperate with the container which has been moved onto the corresponding support table 37, as will be understood.

As each of the containers in engagement with a vacuum chamber carried by the rotary drum is retracted from such engagement, the pin valves 57, which had been unseated by the container, are returned to closed position, thereby cutting off communication between the source of low pressure and the corresponding vacuum chamber. If the apparatus is operated without feeding any containers thereto, or, if any one of the supports carried by the drum is not supplied with a container, the pin valves of the corresponding vacuum chamber are not effected, but remain closed, thereby preventing the flow of atmospheric air into tank 92 by way of said chamber.

By adjusting the cage 42 of the vacuum chamber 41, the end of pin 47, which is engaged by the container wall or closure, may be accurately positioned to effect said engagement by any predetermined movement of the wall or closure in an outward direction. The amount of clearance allowed between the end of pin 47 and the container wall or closure will depend upon the commercial variation in the manufacture of the containers, as hereinbefore indicated, the container closures, the amount of fluid pressure applied to the vacuum chamber, the maximum movement of the flexing portion of the container, which movement may constitute a complete "flip", or the mere outward movement or bulging of the container closure. By adding to the amount of fluid pressure required to "flip" or move the flexible section of the container or container closure, the amount of the internal fluid pressure of the container and regulating the reduced fluid pressure applied to the chamber accordingly, containers having zero vacuum, or any other predetermined internal fluid pressure, may be automatically segregated from those containing a higher internal fluid pressure.

As indicated, the machine illustrated is merely typical, and, obviously, is susceptible of various changes and modifications to accommodate containers of different types or forms, and operate upon different portions of the container walls, without departing from the spirit of the invention. Preferably, the testing of the containers is effected under normal atmospheric temperature conditions, or an average temperature of sixty-five degrees centigrade, or under, of the containers and the contents thereof. The testing may be effected previous to storage or packing of the containers; prior to or subsequent to the labelling of the containers previous to shipment; or, if desired, as a final guarantee to the consumer as to the condition of the commodities within the containers, the latter may be tested by the wholesaler just previous to distributing the goods to the retailer.

What I claim is:

1. The method of testing the internal pressure in sealed containers having flexible sections capable of outward movement under excessive internal pressure, which comprises locally reducing the extraneous pressure on said sections to an extent sufficient to cause such sections to be moved outwardly by the internal pressure only when the internal pressure exceeds a predetermined amount.

2. The method of testing the vacuum in sealed containers having flexible sections normally deformed by exterior air pressure, which comprises locally reducing the extraneous pressure on said sections to an extent sufficient to cause the sections to be moved outwardly by the internal pressure only when the vacuum in the containers is deficient.

3. The method of testing the vacuum in sealed containers having flexible sections normally deformed by exterior air pressure, which comprises locally reducing the extraneous pressure on said sections to an extent sufficient to cause the sections to be moved outwardly by the internal pressure only when the vacuum in the containers is deficient, and utilizing the movement to effect segregation of the said containers from those having a normal vacuum.

4. The method of testing the vacuum in sealed containers having flexible closures, which comprises locally reducing the exterior air pressure on the closures to an extent sufficient to cause the closures of only the containers in which the vacuum is deficient to be moved outwardly by the internal pressure, and utilizing the movement to segregate said containers from those in which the vacuum is normal.

5. The method of testing the vacuum in sealed containers having flexible sections normally deformed by exterior air pressure, which comprises locally reducing the extraneous pressure on said sections to an extent sufficient to cause the sections to be moved outwardly by the internal pressure only when the vacuum in the containers is deficient.

6. The method of testing the vacuum in sealed containers having flexible sections normally deformed by exterior air pressure, which comprises locally reducing the extraneous pressure on said sections to an extent sufficient to cause the sections to be moved outwardly by the internal pressure only when the vacuum in the containers is deficient, and utilizing the movement to actuate an indicator.

7. The method of testing the vacuum in sealed containers having flexible closures, which comprises locally reducing the exterior air pressure on the closures to an extent sufficient to cause only the closures of containers in which the vacuum is deficient to be moved outwardly by the internal pressure.

8. The method of testing the fluid pressure in sealed containers having flexible sections, which comprises locally reducing the extraneous pressure on said sections to an extent sufficient to cause the sections to be moved outwardly by the internal pressure only when the internal fluid pressure is excessive, and utilizing the outward movement to actuate an indicator.

9. The method of testing the fluid pressure in sealed containers having flexible sections, which comprises locally reducing the extraneous pressure on said sections to an extent sufficient to cause the sections to be moved outwardly by the internal pressure only when the internal fluid pressure is excessive, and utilizing the outward movement to segregate such containers from those having normal internal fluid pressure.

10. The method of testing sealed containers having flexible sections, which comprises applying a low fluid pressure to said sections to cause the sections of only those containers having excessive internal fluid pressure to be moved outwardly by the internal pressure, and utilizing the movement to segregate such containers from those having normal internal fluid pressure.

11. The method of testing sealed containers having flexible sections capable of outward movement under excessive internal pressure, which comprises applying a force externally of said sections of a character to to cause said sections to be moved outwardly by the internal pressure only when the internal pressure exceeds a predetermined amount, and utilizing the outward movement to segregate such containers from those having normal internal pressure conditions.

12. A machine for testing the vacuum in sealed containers, comprising means for subjecting the containers to fluid pressure below atmospheric pressure, mechanism for engaging the containers with said means, and means controlled by the movement of the walls of the containers having vacuum deficiencies for segregating said containers from those having normal vacuum conditions.

13. A machine for testing the vacuum in sealed containers having flexible sections, comprising means for applying a reduced air pressure to the exterior of said sections, means for engaging the sections with the applying means in air-tight relation, and means controlled by the movement of the sections of the containers having vacuum deficiencies to segregate said containers from those having normal vacuum conditions.

14. A machine for testing the vacuum in sealed containers having flexible closures, comprising means for applying a reduced air pressure to the exterior of said closures, means for engaging the closures with the applying means in air-tight relation, and means controlled by the movement of the closures of the containers having vacuum deficiencies to segregate said containers from those having normal vacuum conditions.

15. A machine for testing the vacuum in sealed containers having flexible sections normally concaved by the vacuum therein, a chamber with which the container is engaged to bring the flexible sections in air-tight relation, means for reducing the fluid pressure in said chamber, and means controlled by the movement of said flexible sections to segregate the containers having vacuum deficiencies from those having normal vacuum conditions.

16. A machine for testing the vacuum in sealed containers having flexible closures, comprising a chamber, means for effecting a sealed joint between the chamber and the closures of said containers, means for reducing the air pressure in said chamber, and means controlled by the movement of the closures of the containers having vacuum deficiencies to segregate said containers from those having normal vacuum conditions.

17. A machine for testing sealed containers, comprising means for supporting and moving a series of containers in a continuous path, means for subjecting the containers successively to reduced fluid pressure, and means controlled by the movement of the walls of containers having vacuum deficiencies to segregate said containers from those having normal vacuum conditions.

18. A machine for testing sealed containers, comprising a rotary drum, means carried thereby for supporting a series of containers, means carried by the drum and cooperating with the supporting means for subjecting the containers successively to reduced fluid pressure, and means controlled by the movement of the walls of containers having vacuum deficiencies to segregate said containers from those having normal vacuum conditions.

19. A machine for testing sealed containers, comprising a rotary drum, individual supports for containers reciprocably mounted on said drum, means carried by the drum and cooperating with the container supports for subjecting the containers successively to reduced fluid pressure, and means controlled by the movement of the walls of containers having vacuum deficiencies to segregate said containers from those having normal vacuum conditions.

20. A machine for testing sealed containers, comprising a rotary drum, individual supports for containers reciprocably mounted on said drum, chambers carried by the drum in alignment with said supports and engaged by the containers to subject the latter to reduced fluid pressure, and means controlled by the movement of the walls of containers having vacuum deficiencies to segregate said containers from those having normal vacuum conditions.

21. A machine for testing sealed containers, comprising a rotary drum, individual supports for containers reciprocably mounted on said drum, chambers carried by the drum in alignment with said supports and successively engaged and disengaged by the containers, means for successively inducing and relieving reduced fluid pressure in said containers, and means controlled by the movement of the walls of containers having vacuum deficiencies to segregate said containers from those having normal vacuum conditions.

22. A machine for testing sealed containers, comprising a rotary drum, individual supports for containers reciprocably mounted on said drum, chambers carried by the drum in alignment with said supports and successively engaged and disengaged by the containers, means for successively inducing and relieving reduced fluid pressure in said chambers, movable abutments carried by said chambers and actuated by the movement of the walls of containers having vacuum deficiencies, and means controlled by said movable abutments to segregate the containers having vacuum deficiencies.

23. A machine for testing sealed containers, comprising a rotary drum, individual supports for containers reciprocably mounted on said drum, chambers carried by the drum in alignment with said supports and successively engaged and disengaged by the containers, means for successively inducing and relieving reduced fluid pressure in said containers, movable abutments carried by said chambers and actuated by the movement of the walls of containers having vacuum deficiencies, and fluid pressure means the operation of which is controlled by said movable abutments to segregate the containers having vacuum deficiencies.

24. A machine for testing sealed containers, comprising a rotary drum, individual supports for containers reciprocably mounted on said drum, chambers carried by the drum in alignment with said supports and successively engaged and disengaged by the containers, means for successively inducing and relieving reduced fluid pressure in said containers, pins carried by said chambers and advanced by the movement of the walls of containers having vacuum deficiencies, means for locking said pins in advanced position, and means actuated by said locked pins for segregating said containers from those having normal vacuum conditions.

25. A machine for testing sealed containers, comprising a rotary drum, individual supports for containers reciprocably mounted on said drum, chambers carried by the drum in alignment with said supports and successively engaged and disengaged by the containers, means for successively inducing and relieving reduced fluid pressure in said containers, pins carried by said chambers and advanced by the movement of the walls of containers having vacuum deficiencies, means for locking said pins in advanced position, and fluid pressure means the operation of which is controlled by said locked pins for segregating said containers from those having normal vacuum conditions.

26. A machine for testing sealed containers, comprising a rotary drum, individual supports for containers reciprocably mounted on said drum, chambers carried by the drum in alignment with said supports and successively engaged and disengaged by the containers, means for successively inducing and relieving reduced fluid pressure in said containers, pins carried by said chambers and advanced by the movement of the walls of containers having vacuum deficiencies, means for locking said pins in advanced position, fluid pressure means the operation of which is controlled by said locked pins for segregating said containers from those having normal vacuum conditions, and means for releasing said locked pins.

27. A machine for testing sealed containers, comprising a drum rotating about a vertical axis, a series of reciprocatory container supports mounted circumferentially on said drum, a series of chambers mounted on said drum in axial alignment with said supports, means for moving said supports to bring the containers thereon into and out of sealed engagement with the corresponding chambers, means for successively inducing and relieving reduced fluid pressure in said chambers, and means carried by said chambers operated by the movement of the walls of containers having vacuum deficiencies to segregate said containers from those having normal vacuum conditions.

28. A machine for testing sealed containers, comprising a drum rotating about a vertical axis, a series of reciprocatory container supports mounted circumferentially on said drum, a series of chambers mounted on said drum in axial alignment with said supports, means for moving said supports to bring the containers thereon into and out of sealed engagement with the corresponding chambers, means for successively inducing and relieving reduced fluid pressure in said chambers, pins carried by said chambers operated by the movement of the walls of containers having vacuum deficiencies, and means controlled by said pins for segregating said containers from those having normal vacuum conditions.

29. A machine for testing sealed containers, comprising a drum rotating about a vertical axis, a series of reciprocatory container supports mounted circumferentially on said drum, a series of chambers mounted on said drum in axial alignment with said supports, means for moving said supports to bring the containers thereon into and out of sealed engagement with the corresponding chambers, means for successively inducing and relieving reduced fluid pressure in said chambers, pins carried by said chambers operated by the movement of the walls of containers having vacuum deficiencies, and fluid pressure operated means controlled by said pins for segregating said containers from those having normal vacuum conditions.

30. A machine for testing sealed containers, comprising a drum rotating about a vertical axis, a series of reciprocatory container supports mounted circumferentially on said drum, a series of chambers mounted on said drum in axial alignment with said supports, a cam surrounding said drum cooperating with said supports to bring the containers thereon into and out of sealed engagement with the corresponding chambers, means for successively inducing and relieving reduced fluid pressure in said chambers, and means carried by said chambers operated by the movement of the walls of containers having vacuum deficiencies to segregate said containers from those having normal vacuum conditions.

31. A machine for testing sealed containers, comprising a drum rotating about a vertical axis, a series of reciprocatory container supports mounted circumferentially on said drum, a series of chambers mounted on said drum in axial alignment with said supports, a cam surrounding said drum cooperating with said supports to bring the containers thereon into and out of sealed engagement with the corresponding chambers, means for successively inducing and relieving reduced fluid pressure in said chambers, pins carried by said chambers operated by the movement of the walls of containers having vacuum deficiencies, and means controlled by said pins for segregating said containers from those having normal vacuum conditions.

32. A machine for testing sealed containers, comprising a drum rotating about a vertical axis, a series of reciprocatory container supports mounted circumferentially on said drum, a series of chambers mounted on said drum in axial alignment with said supports, a cam surrounding said drum cooperating with said supports to bring the containers thereon into and out of sealed engagement with the corresponding chambers, means for successively inducing and relieving reduced fluid pressure in said chambers, pins carried by said chambers operated by the movement of the walls of containers having vacuum deficiencies, and fluid pressure operated means controlled by said pins for segregating said containers from those having normal vacuum conditions.

33. A machine for testing sealed containers, comprising a drum rotating about a vertical axis, a series of reciprocatory container supports mounted circumferentially on said drum, a series of chambers mounted on said drum in axial alignment with said supports, means for moving said supports to bring the containers thereon into and out of sealed engagement with the corresponding chambers, a valve mounted centrally of said drum and connected with said chambers for successively inducing and relieving reduced fluid pressure in said chambers, and means carried by said chambers operated by the movements of the walls of containers having vacuum deficiencies to segregate said containers from those having normal vacuum conditions.

34. A machine for testing sealed containers, comprising a drum rotating about a vertical axis, a series of reciprocatory container supports mounted circumferentially on said drum, a series of chambers mounted on said drum in axial alignment with said supports, means for moving said supports to bring the containers thereon into and out of sealed engagement with the corresponding chambers, a valve mounted centrally of said drum and connected with said chambers for successively inducing and relieving reduced fluid pressure in said chambers, pins carried by said chambers operated by the movements of the walls of containers having vacuum deficiencies, and means controlled by said pins for segregating said containers from those having normal vacuum conditions.

35. A machine for testing sealed containers, comprising a drum rotating about a vertical axis, a series of reciprocatory container supports mounted circumferentially on said drum, a series of chambers mounted on said drum in axial alignment with said supports, means for moving said supports to bring the containers thereon into and out of sealed engagement with the corresponding chambers, a valve mounted centrally of said drum and connected with said chambers for successively inducing and relieving reduced fluid pressure in said chambers, pins carried by said chambers operated by the movements of the walls of containers having vacuum deficiencies, and fluid pressure operated means controlled by said pins for segregating said containers from those having normal vacuum conditions.

36. A machine for testing sealed containers, comprising a drum rotating about a vertical axis, a series of reciprocatory container supports mounted circumferentially on said drum, a series of chambers mounted on said drum in axial alignment with said supports, a cam surrounding said drum cooperating with said supports to bring the containers thereon into and out of sealed engagement with the corresponding chambers, a valve mounted centrally of said drum and communicating with said chambers for successively inducing and relieving reduced fluid pressure in said chambers, and means carried by said chambers operated by the movement of the walls of containers having vacuum deficiencies to segregate said containers from those having normal vacuum conditions.

37. A machine for testing sealed containers, comprising a drum rotating about a vertical axis, a series of reciprocatory container supports mounted circumferentially on said drum, a series of chambers mounted on said drum in axial alignment with said supports, a cam surrounding said drum cooperating with said supports to bring the containers thereon into and out of sealed engagement with the corresponding chambers, a valve mounted centrally of said drum and communicating with said chambers for successively inducing and relieving reduced fluid pressure in said chambers, pins carried by said chambers operated by the movement of the walls of containers having vacuum deficiencies, and fluid pressure operated means controlled by said pins to segregate said containers from those having normal vacuum conditions.

38. A machine for testing sealed containers, comprising a drum rotating about a vertical axis, a series of resciprocatory container supports mounted circumferentially on said drum, a series of chambers mounted on said drum in axial alignment with said supports, a cam surrounding said drum cooperating with said supports to bring the containers thereon into and out of sealed engagement with the corresponding chambers, a valve mounted centrally of said drum and communicating with said chambers for successively inducing and relieving reduced fluid pressure in said chambers, pins carried by said chambers operated by the movement of the walls of containers having vacuum deficiencies, and means controlled by said pins for segregating said containers from those having normal vacuum conditions.

39. A machine for testing sealed containers, comprising a drum rotating about a vertical axis, a series of reciprocatory container supports mounted circumferentially on said drum, a series of chambers mounted on said drum in axial alignment with said supports, a feed table including a conveyer and a star wheel for feeding and positioning containers on said supports, means for moving said supports to bring the containers thereon into and out of sealed engagement with the corresponding chambers, means for successively inducing and relieving reduced fluid pressure in said chambers, and means carried by said chambers operated by the movement of the walls of containers having vacuum deficiencies to segregate said containers from those having normal vacuum conditions.

40. A machine for testing sealed containers, comprising a drum rotating about a vertical axis, a series of reciprocatory container supports mounted circumferentially on said drum, a series of chambers mounted on said drum in axial alignment with said supports, a feed table including a conveyer and a star wheel for feeding and positioning containers on said supports, said conveyer and star wheel being adjustable for relative timing, means for moving said supports to bring the containers thereon into and out of sealed engagement with the corresponding chambers, means for successively inducing and relieving reduced fluid pressure in said chambers, and means carried by said chambers operated by the movement of the walls of containers having vacuum deficiencies to segregate said containers from those having normal vacuum conditions.

41. A machine for testing sealed containers, comprising a drum rotating about a vertical axis, a series of reciprocatory container supports mounted circumferentially on said drum, a series of chambers mounted on said drum in axial alignment with said supports, a feed table including a conveyer and a star wheel for feeding and positioning containers on said supports and a second star wheel for removing said containers from their supports, means for moving said supports to bring the containers thereon into and out of sealed engagement with the corresponding chambers, means for successively inducing and relieving reduced fluid pressure in said chambers, and means carried by said chambers operated by the movement of the walls of containers having vacuum deficiencies to segregate said containers from those having normal vacuum conditions.

42. A machine for testing sealed containers, comprising a drum rotating about a vertical axis, a series of reciprocatory container supports mounted circumferentially on said drum, a series of chambers mounted on said drum in axial alignment with said supports, a feed table including a conveyer and a star wheel for feeding and positioning containers on said supports and a second star wheel for removing said containers from their supports, said conveyer and star wheels being separately adjustable for relative timing, means for moving said supports to bring the containers thereon into and out of sealed engagement with the corresponding chambers, means for successively inducing and relieving reduced fluid pressure in said chambers, and means carried by said chambers operated by the movement of the walls of containers having vacuum deficiencies to segregate said containers from those having normal vacuum conditions.

43. A machine for testing sealed containers, comprising a drum rotating about a vertical axis, a series of reciprocatory container supports mounted circumferentially on said drum, a series of chambers mounted on said drum in axial alignment with said supports, timed means for positioning containers and removing the same from said supports, means for moving said supports to bring the containers thereon into and out of sealed engagement with the corresponding chambers, means for successively inducing and relieving reduced fluid pressure in said chambers, projectable means carried by said chambers operated by the movement of the walls of containers having vacuum deficiencies, a discharge chute having a movable section to permit containers to drop through the chute, fluid pressure means moving said section to break the continuity of said chute, a valve controlling said fluid pressure means, and means carried by the valve and operated by the projectable means when projected to move the valve to successively supply and relieve fluid pressure in said fluid pressure means when a defective container occupies the movable section of the chute; whereby said defective containers will be segregated from those having normal vacuum conditions.

44. A machine for testing sealed containers, comprising a drum rotating about a vertical axis, a series of reciprocatory container supports mounted circumferentially on said drum, a series of chambers mounted on said drum in axial alignment with said supports, timed means for positioning containers and removing the same from said supports, means for moving said supports to bring the containers thereon into and out of sealed engagement with the corresponding chambers, means for successively inducing and relieving reduced fluid pressure in said chambers, projectable means carried by said chambers operated by the movement of the walls of containers having vacuum deficiencies, a discharge chute having a movable section to permit containers to drop through the chute, fluid pressure means moving said section to break the continuity of said chute, a valve controlling said fluid pressure means, a star wheel carried by the valve and operated by the projectable means when projected to move the valve to successively supply and relieve fluid pressure in said fluid pressure means when a defective container occupies the movable section of the chute; whereby said defective containers will be segregated from those having normal vacuum conditions.

45. A machine for testing sealed containers, comprising a drum rotating about a vertical axis, a series of reciprocatory container supports mounted circumferentially on said drum, a series of chambers mounted on said drum in axial alignment with said supports, timed means for positioning containers and removing the same from said supports, means for moving said supports to bring the containers thereon into and out of sealed engagement with the corresponding chambers, means for successively inducing and relieving reduced fluid pressure in said chambers, projectable means carried by said chambers operated by the movement of the walls of containers having vacuum deficiencies, means to lock said projectable means in projected position, a discharge chute having a movable section to permit containers to drop through the chute, fluid pressure means moving said section to break the continuity of said chute, a valve controlling said fluid pressure means, and means carried by the valve and operated by the projectable means when projected to move the valve to successively supply and relieve fluid pressure in said fluid pressure means when a defective container occupies the movable section of the chute; whereby said defective containers will be segregated from those having normal vacuum conditions.

46. A machine for testing sealed containers, comprising a drum rotating about a vertical axis, a series of reciprocatory container supports mounted circumferentially on said drum, a series of chambers mounted on said drum in axial alignment with said supports, timed means for positioning containers and removing the same from said supports, means for moving said supports to bring the containers thereon into and out of sealed engagement with the corresponding chambers, means for successively inducing and relieving reduced fluid pressure in said chambers, projectable means carried by said chambers operated by the movement of the walls of containers having vacuum deficiencies, means to lock said projectable means in projected position, a discharge chute having a movable section to permit containers to drop through the chute, fluid pressure means moving said section to break the continuity of said chute, a valve controlling said fluid pressure means, and a star wheel carried by the valve and operated by the projectable means when projected to move the valve to successively supply and relieve fluid pressure in said fluid pressure means when a defective container occupies the movable section of the chute; whereby said defective containers will be segregated from those having normal vacuum conditions.

47. A machine for testing sealed containers, comprising a drum rotating about a vertical axis, a series of reciprocatory container supports mounted circumferentially on said drum, a series of chambers mounted on said drum in axial alignment with said supports, timed means for positioning containers and removing the same from said supports, means for moving said supports to bring the containers thereon into and out of sealed engagement with the corresponding chambers, means for successively inducing and relieving reduced fluid pressure in said chambers, projectable means carried by said chambers operated by the movement of the walls of containers having vacuum deficiencies, means to lock said projectable means in projected position, a discharge chute having a movable section to permit containers to drop through the chute, fluid pressure means moving said section to break the continuity of said chute, a valve controlling said fluid pressure means, a star wheel carried by the valve and operated by the projectable means when projected to move the valve to successively supply and relieve fluid pressure in said fluid supply means when a defective container occupies the movable section of the chute, and means to release the lock for the projectable means after the latter has functioned; whereby said defective containers will be segregated from those having normal vacuum conditions.

48. A machine for testing sealed containers, comprising a drum rotating about a vertical axis, a series of reciprocatory container supports mounted circumferentially on said drum, means for feeding and positioning containers on said supports, a series of chambers mounted on said drum in axial alignment with said supports, means for moving said supports to bring the containers thereon into and out of sealed engagement with the corresponding chambers, means for successively inducing and relieving reduced fluid pressure in said chambers, and means carried by said chambers operated by the movement of the walls of containers having vacuum deficiencies to segregate said containers from those having normal vacuum conditions.

49. A machine for testing sealed containers, comprising a drum rotating about a vertical axis, a series of reciprocatory container supports mounted circumferentially on said drum, means for feeding and positioning containers on said supports and subsequently removing the same from said supports, a series of chambers mounted on said drum in axial alignment with said supports, means for moving said supports to bring the containers thereon into and out of sealed engagement with the corresponding chambers, means for successively inducing and relieving reduced fluid pressure in said chambers, and means carried by said chambers operated by the movement of the walls of containers having vacuum deficiencies to segregate said containers from those having normal vacuum conditions.

50. A machine for testing sealed containers, comprising a drum rotating about a vertical axis, a series of reciprocatory container supports mounted circumferentially on said drum, a conveyer and coordinated star wheel for feeding and positioning containers on said supports, a series of chambers mounted on said drum in axial alignment with said supports, means for moving said supports to bring the containers thereon into and out of sealed engagement with the corresponding chambers, means for successively inducing and relieving reduced fluid pressure in said chambers, and means carried by said chambers operated by the movement of the walls of containers having vacuum deficiencies to segregate said containers from those having normal vacuum conditions.

51. A machine for testing sealed containers, comprising a drum rotating about a vertical axis, a series of reciprocatory container supports mounted circumferentially on said drum, a conveyer and coordinated star wheels for feeding and positioning containers on said supports and subsequently removing the same from said supports, a series of chambers mounted on said drum in axial alignment with said supports, means for moving said supports to bring the containers thereon into and out of sealed engagement with the corresponding chambers, means for successively inducing and relieving reduced fluid pressure in said chambers, and means carried by said chambers operated by the movement of the walls of containers having vacuum deficiencies to segregate said containers from those having normal vacuum conditions.

52. A machine for testing sealed containers, comprising a rotary carrier, individual supports for containers reciprocably mounted on said carrier, means on the carrier cooperating with the container supports for subjecting the containers successively to reduced fluid pressure, and means operated by the movement of the walls of containers having vacuum deficiencies to segregate said containers from those having normal vacuum conditions.

53. A machine for testing sealed containers, comprising a rotary carrier, means on the carrier for subjecting individual containers to reduced fluid pressure, projectable means operated by the movement of the walls of containers having vacuum deficiencies, a discharge device for said machine including a chute having a movable section, and mechanism controlled by said projectable means for withdrawing the movable section and thereby segregating containers having vacuum deficiencies from those having normal vacuum conditions.

54. A machine for testing sealed containers having wall sections capable of outward movement under excessive internal pressure, comprising means for applying a force externally of said sections of a character to cause said sections to be moved outwardly by the internal pressure when the internal pressure of said containers exceeds a predetermined amount, and means controlled by the outward movement of said sections to segregate such containers from those having normal internal pressures.

55. The method of testing sealed containers having flexible sections capable of outward movement under abnormal internal pressure, which comprises applying a force externally of said sections of a character to cause said sections to be moved outwardly by the internal pressure only when the internal pressure exceeds a predetermined amount, and segregating the containers whose sections respond to the applied force from those having normal internal pressure conditions.

In testimony whereof I affix my signature.

FRANCIS H. LANDRUM.